(12) United States Patent
Ma et al.

(10) Patent No.: US 12,154,176 B2
(45) Date of Patent: Nov. 26, 2024

(54) METHOD AND SYSTEM FOR DETECTING INSURANCE LOSS AND AUTOMATING INSURANCE LOSS PREVENTION

(71) Applicant: Chrp Technologies, Inc, DeBary, FL (US)

(72) Inventors: Chin Ma, DeBary, FL (US); Micah Kalisch, DeBary, FL (US)

(73) Assignee: Chrp Technologies, Inc, DeBary, FL (US)

( * ) Notice: Subject to any disclaimer, the term of this patent is extended or adjusted under 35 U.S.C. 154(b) by 0 days.

(21) Appl. No.: 18/087,563

(22) Filed: Dec. 22, 2022

(65) Prior Publication Data
US 2023/0196474 A1   Jun. 22, 2023

Related U.S. Application Data

(60) Provisional application No. 63/292,475, filed on Dec. 22, 2021.

(51) Int. Cl.
*G06V 10/764*   (2022.01)
*G06Q 40/08*   (2012.01)

(52) U.S. Cl.
CPC .......... *G06Q 40/08* (2013.01); *G06V 10/764* (2022.01)

(58) Field of Classification Search
CPC ............................. G06Q 40/08; G06V 10/764

USPC ............................................................ 705/4
See application file for complete search history.

(56) References Cited

U.S. PATENT DOCUMENTS

| | | | |
|---|---|---|---|
| 7,809,587 B2* | 10/2010 | Dorai | G06Q 10/10 703/8 |
| 11,514,526 B1* | 11/2022 | Kwartler | G06V 10/82 |
| 2020/0034934 A1* | 1/2020 | Kroell | G06V 20/59 |
| 2023/0368074 A1* | 11/2023 | Mallya | G06N 20/00 |

* cited by examiner

*Primary Examiner* — William E Rankins
(74) *Attorney, Agent, or Firm* — CHIP LAW GROUP

(57) ABSTRACT

Provided is a method and system for automating property inspection for prevention of insurance claims or losses using an Artificial Intelligence (AI)-based classifier. The method and system includes accessing digital images corresponding to a property. A trained AI-based classifier classifies the digital images into one or more AI containers based on inspection points and sub-inspection points in relation to the property. Each AI container comprises one or more secondary AI models. The one or more secondary AI models in a respective AI container, detect a condition pertaining to one or more components identified in the digital images, by analyzing the digital images based on the inspection points and sub-inspection points associated with the respective AI container. A signal indicative of insurance loss based on the detected condition pertaining to the one or more components is then derived. An inspection report providing recommendations for action plans is further generated.

16 Claims, 5 Drawing Sheets

METHOD AND SYSTEM FOR DETECTING INSURANCE LOSS AND AUTOMATING INSURANCE LOSS PREVENTION

FIELD

The present disclosure generally relates to homeowners' insurance and home warranty solutions and more specifically, to a method and system for automating detection of insurance loss based on home inspection and prevention of insurance claims or losses, through usage of an Artificial Intelligence (AI)-based classifier.

BACKGROUND

Home insurance companies generally pay a huge sum of money in claims annually, wherein a substantial amount in those claims is avoidable. Virtually, all insurers miss the opportunity to avoid these substantial payouts, due to lack of preventative maintenance embedded into the consumer's home insurance experience.

Loss prevention refers to any action that is taken to reduce the amount of theft, breakage, or wastage in a business. Adoption of loss prevention in the insurance industry has dramatically reduced claims, specifically in the personal automotive insurance industry. This is analogous to telematics that has made driving and therefore the drivers safer. However, for enabling such loss prevention strategies, currently, the insurance industry faces a multitude of challenges. For instance, underwriters of home insurance do not have the required expertise to understand a multitude of risks that come with a building's construction and home inspectors do not have the expertise to understand coverage and risk-management associated with insurances. As a result, there is a disconnect between the recognition of a potential loss that is preventable, such as a faulty water supply line in a toilet or a kitchen sink.

Further, erstwhile solutions available for prevention of such insurance loss or claims, do not proactively identify issues that may lead to potential insurance claim, and therefore are unable to implement appropriate measures for prevention of such losses in a timely manner.

Limitations and disadvantages of conventional and traditional approaches will become apparent to one of ordinary skill in the art, through comparison of described systems with some aspects of the present disclosure, as set forth in the remainder of the present application and with reference to the drawings.

SUMMARY

A method and system for automating detection of insurance loss or risk and insurance loss prevention is provided substantially as shown in and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The following described implementations may be found in the disclosed method and system for detecting insurance loss or risk and automating insurance loss prevention using an AI-based classifier.

Various aspects of the present disclosure are described by narrative text, flowcharts, block diagrams of computer systems and/or block diagrams of the machine logic included in system and method embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

Figure 1:
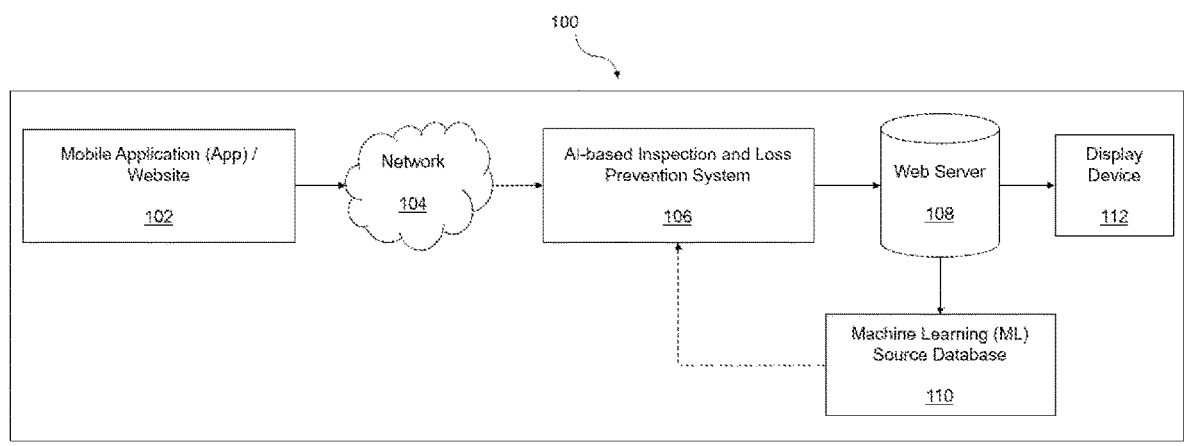
FIG. 1 is a diagram that illustrates an environment implementing systems and/or methods described herein in accordance with an exemplary embodiment of the disclosure.

FIG. 1 is a diagram that illustrates an environment implementing systems and/or methods described herein in accordance with an exemplary embodiment of the disclosure. Referring to FIG. 1, there is shown a computing environment 100 that includes a mobile application (app)/website 102, a network 104, an Artificial Intelligence (AI)-based inspection and loss prevention system 106, a web server 108, a machine learning (ML) source database 110, and a display device 112.

The computing environment 100 may be associated with respective computing environment providers. The computing environment 100 may include, but is not limited to, private computing environments and public computing environments which provide multitenancy hosting capabilities an internal or enterprise cloud that resides on an enterprise's intranet or hosted data center, one or more shared public computing environments shared by multiple enterprise tenants using a multitenancy architecture.

The mobile application/website 102 of the computing environment 100 is a computer program or a software application that is designed to run on one or more devices that may include, but are not limited to, a smartphone, a tablet, a handheld device, a smart watch, a desktop computer, a laptop computer, and a tablet computer now known or to be developed in the future that is capable of running a program, accessing a network or querying a database.

As is well understood in the art of computer technology, and depending upon the technology, the performance of a computer-implemented method may be distributed among multiple computers and/or between multiple locations. On the other hand, in this presentation of the computing environment 100, a detailed discussion is focused on a single computer, specifically the mobile application/website 102, to keep the presentation as simple as possible. In some examples, the mobile application/website 102 may be located on a cloud.

The network 104 may be any network or combination of networks of devices that communicate with one another. For example, the network 104 may be one of or combination of a local area network (LAN), wide area network (WAN), home area network (HAN), backbone networks (BBN), peer-to-peer networks (P2P), telephone network, wireless network, point-to-point network, star network, token ring network, single tenant or multi-tenant cloud computing networks, hub network, and public switched telephone network (PSTN), or other appropriate configuration known by a person skilled in the art to interconnect the devices. The end user device 110 may communicate via the network 104 using Transmission Control Protocol/Internet Protocol (TCP/IP) and/or use other common Internet protocols such as, but not limited to, HTTP, FTP, AFS, WAP, to communicate at a higher network level.

In some embodiments, the network 104 of the computing environment 100 may utilize clustered computing and components acting as a single pool of seamless resources when accessed through the network 104 by one or more computing systems. Such embodiments may be used in a data center, cloud computing network, storage area network (SAN), and network-attached storage (NAS) applications.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

A cloud computing environment is service-oriented, focusing on statelessness, low coupling, modularity, and semantic interoperability. At the heart of cloud computing is an infrastructure that includes a network of interconnected nodes.

In some non-limiting embodiments, the cloud computing environment includes a cloud network comprising one or more cloud computing nodes with which cloud consumers may use the end-user device(s) or client devices to access one or more software products, services, applications, and/or workloads provided by cloud service providers or tenants of the cloud network. Examples of the user device are depicted and may include devices such as, but not limited to. a desktop computer, a laptop computer, a smartphone, a cellular telephone, a tablet computer, and a smart device such as a smartwatch or smart glasses. Cloud computing nodes may communicate with one another and may be grouped physically or virtually in one or more networks, such as Private, Community, Public, or Hybrid clouds as described hereinabove, or a combination thereof. This allows the cloud computing environment to offer infrastructure, platforms, and/or software as services for which a cloud consumer does not need to maintain resources on a local computing device.

Public Cloud is any computer system available for use by multiple entities that provides on-demand availability of computer system resources and/or other computer capabilities, especially data storage (cloud storage) and computing power, without direct active management by the user.

Private Cloud is similar to the public cloud, except that the computing resources are only available for use by a single enterprise. While the private cloud is depicted as being in communication with a WAN, in other embodiments, a private cloud may be disconnected from the internet entirely and is only accessible through a local or private network.

A hybrid cloud is composed of multiple clouds of different types (for example, private, community, or public cloud types), often implemented by different vendors. Each of the multiple clouds remains a separate and discrete entity. Still, the larger hybrid cloud architecture is bound together by standardized or proprietary technology that enables orchestration, management, and/or data or application portability between the multiple constituent clouds.

The AI-based inspection and loss prevention system 106 of the computing environment 100 may comprise suitable logic, circuitry, interfaces and/or code that may be operable to perform automated inspection of a property to detect insurance loss or risk and prevent insurance claims or losses. In operation, the AI-based inspection and loss prevention system 106 accesses one or more digital images corresponding to a property. The property may include, but is not limited to, a home, a residential building and an office. The plurality of digital images may be accessed via different.

data interfaces or may be uploaded by one or more users (for example, homeowners). For instance, the plurality of digital images may be accessed from, but not limited to, satellite imaging data, aerial imaging data, street view data 106, property assessor's data, and building permits.

The plurality of digital images are classified into one or more AI containers based on one or more inspection points in relation to the property using an AI-based classifier. Each AI container includes one or more secondary AI models. The one or more secondary AI models in a respective AI container, detect a condition pertaining to one or more components identified in one or more digital images of the plurality of digital images. The condition is detected based on analyzing the one or more digital images based on the one or more inspection points associated with the respective AI container. A signal indicative of insurance loss based on the detected condition pertaining to the one or more components, is then derived.

The web server 108 of the computing environment 100 may be, but is not limited to, a laptop computer, a netbook computer, a personal computer (PC), a desktop computer, or any programmable electronic device or any network of programmable electronic devices capable of hosting and running a monitoring program and a database and communicating with the display device 112. The web server 108 may include internal components and external components. The web server 108 may also operate in a cloud computing service model, such as Software as a Service (SaaS), Platform as a Service (PaaS), or Infrastructure as a Service (IaaS). In some embodiments, the web server 108 may be located in a cloud computing deployment model, such as a private cloud, community cloud, public cloud, or hybrid cloud.

In some embodiments, the web server 108 comprises a data storage such as, for example, Microsoft Azure® Blob Storage that may store unstructured data (e.g., audio, video, images, text) in Microsoft® cloud platform. The stored data may be accessed from any remote location. Blob storage allows Microsoft Azure® to arbitrarily store large amounts of unstructured data and serve them to users over HTTP and HTTPS.

The machine learning (ML) source database 110 may comprise suitable logic, circuitry, interfaces and/or code that may be operable to receive data from the web server 108 to segregate and store the images of classified inspection and sub-inspection points in a categorized order. For instance, the categories may be based on inspection points of the home and month of the year when the inspection was reviewed. These ordered images are then used for data analytics and AI model development.

In some embodiments, the AI-based inspection and loss prevention system 106 is communicatively coupled with the ML learning source database 110 to receive input data. The AI-based inspection and loss prevention system 106 may further classify the input data. It may be noted that the AI-based inspection and loss prevention system 106 may be initially trained by the ML learning source database 110 using a known learning source. Based on the training received from the known learning source, the AI-based inspection and loss prevention system 106 may the classify input data.

The input data received from the ML learning source database 110 may then be later validated during a validation phase, during which misclassifications may be detected by the AI-based inspection and loss prevention system 106. In some embodiments, a reference may be used to cross-check and evaluate the misclassification that was detected. When a misclassification is encountered, the AI-based inspection and loss prevention system 106 may require correction for the erroneous classification of the input data. In cases of misclassification of the input data, the ML learning source database 110 that is responsible for the current behavior or misclassification may be traced. In some embodiments, re-learning happens along with the misclassified data which is seen as distinct data although they are very closely related to each other with respect to their features or properties.

The display device 112 of the computing environment 100 may include any device capable of wireless communication such as but not limited to, a cellular telephone, a computer, a server, a router, a laptop, a tablet, a wearable device, a watch, and an appliance. The display device 112 may include hardware and/or firmware and software configured to communicate using different wireless communication protocol including, but not limited to, Bluetooth Low Energy (BLE), Bluetooth, Wi-Fi, CDMA, and TDMA.

The display device 112 may receive transmitted signals from the web server 108 in real-time, which is formatted in accordance with the wireless communication protocol configured in the display device 112. The transmitted signal may be a backscatter signal that may include, but is not limited to, a Bluetooth signal (e.g., such as an advertising packet), a Wi-Fi signal (e.g., such as a beacon frame), and/or a ZigBee signal. For example, the backscatter signal may be an IEEE 802.15.4 beacon frame. In this manner, no additional software, firmware, or hardware may be required for the display device 112 to receive and decode the transmitted backscatter signal than is required for the display device 112 to receive and decode received signals from other sources that are formatted in accordance with the wireless communication protocol.

Figure 2:
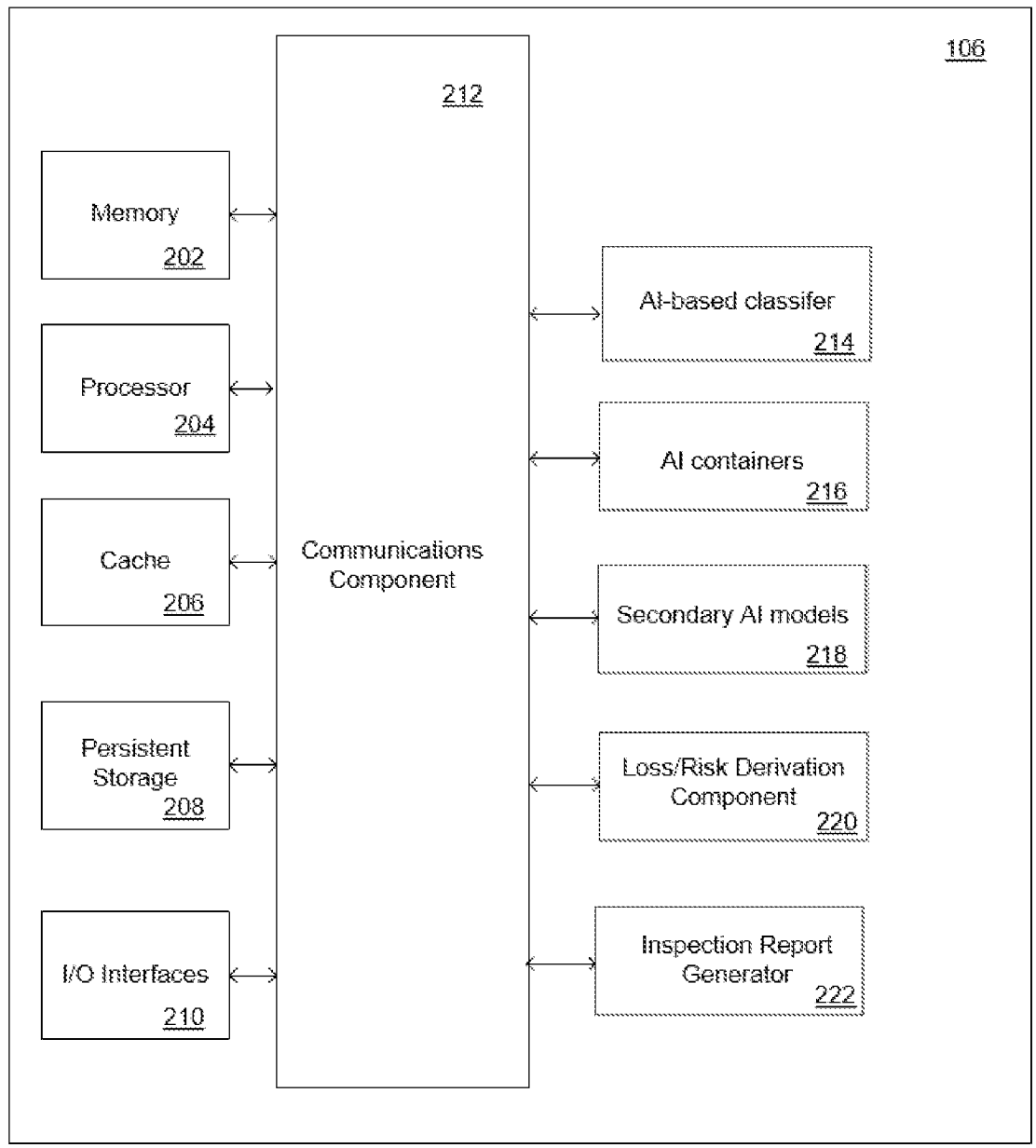
FIG. 2 is diagram that illustrates an AI-based inspection and loss prevention system in accordance with an exemplary embodiment of the disclosure.

FIG. 2 is diagram that illustrates an AI-based inspection and loss prevention system in accordance with an exemplary embodiment of the disclosure. Referring to FIG. 2, there is shown the AI-based inspection and loss prevention system 106 that includes a memory 202, a processor 204, a cache 206, a persistent storage 208, I/O interfaces 210, a communications component 212, an AI-based classifier 214, AI containers 216, secondary AI models 218, a loss/risk derivation component 220 and an inspection report generator 222.

The memory 202 may comprise suitable logic and/or interfaces that may be configured to store instructions (for example, the computer-readable program code) that can implement various aspects of the present disclosure. In an embodiment, the memory 202 includes random access memory (RAM). In general, the memory 202 can include any suitable volatile or non-volatile computer-readable storage media.

The processor 204 may comprise suitable logic, interfaces, and/or code that may be configured to execute the instructions stored in the memory 202 to implement various functionalities of the AI-based inspection and loss prevention system 106 in accordance with various aspects of the present disclosure. The processor 204 may be further configured to communicate with multiple modules of the AI-based inspection and loss prevention system 106 via the communication module 212.

The cache 206 is a memory that is typically used for data or code that should be available for rapid access by the threads or cores running on the processor 204. Cache memories are usually organized into multiple levels depending upon relative proximity to the processing circuitry. Alternatively, some, or all, of the cache for the processor set may be located "off-chip".

Computer readable program instructions are typically loaded onto the AI-based inspection and loss prevention system 106 to cause a series of operational steps to be performed by the processor 204 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as the cache 206 and the other storage media discussed below. The program instructions, and associated data, are accessed by the processor 204 to control and direct the performance of the inventive methods.

The persistent storage 208 is any form of non-volatile storage for computers that is now known or to be developed in the future. The non-volatility of this storage means that the stored data is maintained regardless of whether power is being supplied to the AI-based inspection and loss prevention system 106 and/or directly to the persistent storage 208. The Persistent storage 208 may be a read only memory (ROM). Still, typically at least a portion of the persistent storage allows writing of data, deletion of data, and re-writing of data. Some familiar forms of persistent storage include magnetic disks and solid-state storage devices. The media used by persistent storage 208 may also be removable. For example, a removable hard drive may be used for persistent storage 208. Other examples include optical and magnetic disks, thumb drives, and smart cards inserted into a drive for transfer onto another computer-readable storage medium that is also part of persistent storage 208.

The I/O interfaces 210 may comprise suitable logic, interfaces, and/or code that may be configured to receive data input from other devices that may be connected to the AI-based inspection and loss prevention system 106 and output information to other devices connected to the AI-based inspection and loss prevention system 106. For example, the I/O interface(s) 210 may provide a connection to an external device(s) such as a keyboard, a keypad, a touch screen, and/or some other suitable input device. External device(s) can also include portable computer-readable storage media, such as, for example, thumb drives, portable optical or magnetic disks, and memory cards. Program instructions and data (e.g., software and data) used to practice embodiments of the present disclosure can be stored on such portable computer-readable storage media and loaded onto the persistent storage 208 via the I/O interface(s) 210.

The I/O interfaces 210 are configured to access a plurality of digital images corresponding to a property. The property may include, but is not limited to, a home, a residential building and an office. The plurality of digital images may be accessed via different data interfaces or may be uploaded by one or more users (for example, homeowners). For instance, the plurality of digital images may be accessed from, but not limited to, satellite imaging data, aerial imaging data, street view data 106, property assessor's data, and building permits.

In some embodiments, the plurality of digital images are provided to the AI-based inspection and loss prevention system 106 via the I/O interfaces 210 from the mobile app/website 102.

The plurality of digital images may comprise metadata that may include, but are not limited to, a camera make, a camera model, white balance, ISO speed ratings, an aperture, a shutter speed, a timestamp, an image resolution, a file name, a file size, a lens used, a focal length, an exposure bias, and flash.

The communications component 212 may comprise suitable logic, interfaces, and/or code that may be configured to transmit data between modules, engines, databases, memories, and other components of the AI-based inspection and loss prevention system 106 for use in performing functions discussed herein. The communication module 212 may include one or more communication types and utilizes various communication methods for communication within the AI-based inspection and loss prevention system 106.

The AI-based classifier 214 may comprise suitable logic, interfaces, and/or code that may be configured to classify the plurality of digital images into one or more AI containers 216 based on one or more inspection points in relation to the property. Each AI container includes one or more secondary AI models 218. The one or more inspection points may include, but are not limited to, toilet plumbing, sink plumbing, washer supply line and valve, electrical panel, water heater, address verification, product label and roof model.

In accordance with an embodiment, the AI-based classifier 214 classifies the plurality of digital images into the one or more AI containers 216 based on one or more categories and one or more sub-inspection points in relation to the property. The one or more categories may include, but are not limited to, a home category and a room category. The one or more sub-inspection points may include, but are not limited to, a water valve, a plumbing joint, a tank bolt, corrosion, rusting, a leaking water supply line, a coupler nut, mains breakers, a manufacture date of HVAC, a brand of HVAC, a manufacture date of furnace, and a brand of furnace.

The AI-based classifier 214 is iteratively auto-trained using new digital images until the AI-based classifier 214 reaches a maximum precision.

In accordance with an embodiment, the one or more AI containers 216 are backend containers that may include, but are not limited to, toilet plumbing AI container, sink plumbing AI container, washer supply AI container, electrical panel AI container, water heater AI container, address verification AI container, Optical Character Recognition (OCR) AI container, and a roof AI container.

The one or more secondary AI models 218 in a respective AI container, may comprise suitable logic, interfaces, and/or code that may be configured to detect a condition pertaining to one or more components identified in one or more digital images. The condition is detected based on analyzing the one or more digital images based on the one or more inspection points associated with the respective AI container. A condition is at least one of a damage and a health status of a component, wherein the component may be a home component in an instance.

In accordance with an embodiment, the one or more secondary AI models 218 identify and scale the one or more components down to an extra small pixel level. Using this gradient process, the one or more secondary AI models 218 detect a condition pertaining to the one or more components on a pixel level scale.

In accordance with an embodiment, the one or more secondary AI models 218 may include, but are not limited to, a toilet plumbing secondary AI model, a sink plumbing secondary AI model, a washer supply secondary AI model, an electrical panel secondary AI model, a water heater secondary AI model, an address verification secondary AI model, an Optical Character Recognition (OCR) secondary AI model, and a roof secondary AI model.

The one or more AI containers 216, upon receiving the plurality of digital images trigger associated secondary AI models to begin running starting at a large spectrum to identify specific components and objects from the plurality of inspection points, and scale them down to a small spectrum and to an extra small pixel level model.

The loss/risk derivation component 220 may comprise suitable logic, interfaces, and/or code that may be configured to derive a signal indicative of insurance loss based on the detected condition pertaining to the one or more components.

In accordance with an exemplary embodiment, configuration and operation of the AI-based inspection and loss prevention system 106 for home inspection and loss prevention thereafter are described.

The AI-based classifier 214 segments each image of the plurality of digital images containing inspection points into the one or more (backend) AI containers 216. Each AI container is a specific inspection point or points that need to be analyzed.

An AI container system comprising the AI containers 216, automates operations to run containerized workloads and services. The Kubernetes® platform is a portable, extensible, open-source platform for container orchestration (i.e., for managing containerized workloads and services). Kubernetes is a registered trademark of The Linux Foundation located in San Francisco, California. An AI container is a lightweight and portable executable image that contains software and all of its dependencies.

In an embodiment of the present disclosure, a computer system may be implemented that includes one or more computer processors, one or more computer readable storage media, computer readable code stored collectively in the one or more computer readable storage media. The computer readable code includes data and instructions to cause the one or more computer processors to perform operations. The operations include identifying and analyzing state information about containerized applications in one or more clusters in a container orchestration system.

The AI-based classifier 214 classifies the plurality of digital images into the following one or more inspection points and one or more sub-inspection points.

Roofs (inspection Point): comprising of identification and classification of the following types of roofs such as, but not limited to, Three-tab shingle, Architectural shingle, Rolled membrane, Tile, Metal, Wood shake, and Concrete.

Identification of the roof inspection points comprises the following sub-inspection points such as, but not limited to, Degradation of the roof shingle, Degradation along the edges of the shingle as it connects with other shingles, Excessive debris or other large objects on the roof, and Tarp(s) covering the roof surface.

Bathroom (inspection points): comprising of identification and classification of the following types of objects found in the bathroom such as, but not limited to, toilet plumbing and bathroom sink plumbing.

Identification of the toilet plumbing inspection point comprises the following sub-inspection points such as, but not limited to, corrosion, rusting, and/or leaking of tank bolt, rusting and/or leaking of water supply line, rusting and/or leaking of water connection valve, and improper installation and/or breakage of structure off coupler nut connecting the water supply line with the toilet water tank.

Identification of the bathroom sink plumbing inspection point comprises the following sub-inspection points such as, but not limited to, corrosion, rusting and/or leaking of water supply line, and corrosion, rusting and/or leaking of water connection valve.

Kitchen (inspection points): comprising of identification and classification of the following types of objects found in the kitchen such as, but not limited to, kitchen sink plumbing inspection point.

Identification of the inspection point further comprises the following sub-inspection points such as, but not limited to, corrosion, rusting and/or leaking of water supply line, and corrosion, rusting and/or leaking of water connection valve.

Utility—Electrical Panel (inspection points): comprising of identification and classification of the following types of objects such as, but not limited to, make of the electrical panel by observing the electrical panel cover.

Identification of the inspection point further comprises the following sub-inspection points such as, but not limited to, identification of electrical panel main breakers and analysis of the sub-inspection points such as missing main breakers, identification of the electrical panel circuit breakers and the analysis of the sub-inspection points such as missing circuit breakers, and identification of electrical panel product label and identification of the following sub-inspection points such as, serial number to determine the manufacture date of the electrical panel, and brand to determine the make of the electrical panel.

Utility—Water Heater (inspection points): comprising of identification and classification of the following types of objects such as, but not limited to, identification of a tank water heater or tankless water heater and analysis of the following sub-inspection points can include, but not limited to, excessive corrosion of water heater and leaking on the sides of water heater.

Identification of the water heater product label comprising identification of the following sub-inspection points such as, but not limited to, serial number to determine the manufacture date of the water heater and brand to determine the make of the water heater.

Identification of the water heater connection valves, supply lines and/or pipes inspection point, comprising of the following sub-inspection points such as, but not limited to, corrosion, rusting and/or leaking of the water supply line, and corrosion, rusting and/or leaking of the water connection valve.

Utility—Heating, Ventilation, and Air Conditioning (HVAC) (inspection points): comprising of the following types of objects found and automated analysis:

Identification of the HVAC and analysis of the corresponding sub-inspection points.

Identification of the HVAC product label and the identification of the following sub-inspection points such as, but not limited to, serial number to determine manufacture date of the HVAC, and brand to determine the make of the HVAC.

Utility—Furnace (inspection points): comprising of the following types of objects found and automated analysis:

Identification of the Furnace and analysis of the corresponding sub-inspection points.

Identification of the Furnace product label and the identification of the following sub-inspection points such as, but not limited to, serial number to determine manufacture date of the Furnace, and brand to determine make of the Furnace.

The inspection report generator 222 may comprise suitable logic, interfaces, and/or code that may be configured to generate an inspection report based on the signal. The inspection report may include one or more recommendations related to insurance risks and insurance loss prevention actions. The inspection report may also include other data such as, but not limited to, an estimated cost to fix, an actual cost to fix, a client follow-up status, a resolution status, timestamps, and resolution notes.

In some instances, the one or more recommendations provided to entities may include, but are not limited to, maintenance programs, repair services, and cancellation of policies. The entities may include, but are not limited to, insurance companies, insurance provides, agents, insurance dealers, and homeowners.

The recommendations that are provided to entities may be used for instances such as, but not limited to, insurance underwriting to determine risk while reviewing an application for new insurance, for insurance claims to determine attribution of inspection quality over time to decide payment of a claim and cost of the claim, and for insurance loss prevention to mitigate losses altogether.

In accordance with an embodiment, in addition to general loss prevention, educational tools are provided to assist insurance providers, agents, and homeowners with better insights and understanding of their homes.

The inspection report generator 222, in addition to the recommendations, also provides a home analytics dashboard with a bullet type overview that may be expanded. The analytics dashboard uses the metadata captured during any inspection and combines a comprehensive loss prevention picture. All the information stored are available at a user level and may be filtered down to an individual address or person vis-à-vis the dashboard. The utility of the dashboard for different users is as follows:

For a homeowner, the analytics dashboard provides insights into the overall health of the home and may be used to better tailor maintenance programs. This data is also available for obtaining home repair services, applying for new insurance, and for home sales.

For an insurance sales agent, the same data is available at the agency level and may be used to understand loss ratios, health of their book of business, cancellations, shopping policies, and providing feedback to policy holders.

For a carrier or a warranty company, the analytics dashboard relays vital information pertaining to rating, concentration, losses, hazardous areas such as specific neighborhoods, and an overall data science umbrella for the health of the policy book of business. This may also be available at request of a homeowner when it comes to the history and wellbeing of a particular structure. Data provided in this manner may also be used for targeted sales campaigns and marketing.

The analytics dashboard enables tracking AI efficacy on the inward and outward facing aspects and ties into the stored metadata that is captured by the AI/ML models.

An agile data lake is the main storage platform for the data that is captured through the inspection process and the data is stored on a property level along with other attributes such as unique identifiers. In the event that a property is requested by a client that data can be pulled and presented with as much or as little information as is needed, the data lake serves as the basis for this process.

To provide enhanced user experience, the disclosed technology platform provides inspection guides. Virtual inspections include supplemental and just-in-time digital reality experiences. Digital reality Virtual Reality (VR)/Augmented Reality (AR) images of the desired inspection point such as, but not limited to, toilet plumbing, water heater, HVAC, may be overlaid on a camera screen to guide users to take the correct photo.

Change detection AI has been designed to take a property over time and using multiple inspections of the same property and stored metadata, the AI understands the way products degrade and prevents future unseen losses. With change detection AI, the AI/ML models assess every photo for quality and condition before passing them onto the secondary models which run an over-time comparison of a selected component and assign a score or a recommendation. These in turn are also stored with the property data for future consumption.

In addition to identifying underlying issues through photo inspections, the technology platform provides repair recommendations and services along with having integrations to service providers as follows:

Contractors: These service providers have to ability to set up as a preferred vendor and have the opportunity to bid for areas of coverage. The technology platform offers a lead served at the homeowner's request and passes over the identified hazards along with any required information to get a service call set up.

Retailers: These service providers which may include a home improvement store, may be able to bid for lead services and products in turn leading to the sale of a product. Through API, the technology platform, using AI/ML, can record the specific product photographed during the inspection, its availability, placement within the store such as an isle or a bay number, and the cost of the product.

Homeowners: While most companies use the technology platform with a specific frequency, for homeowners, the goal is to have an annual inspection notification that provides ongoing feedback. Through this notification, homeowners may be advised of any deterioration of the home and the simple ways that such things can be remedied. Change detection AI serves automated notifications and insights to provide homeowners with recommendations to conduct specific repairs that have been identified.

Figure 3:
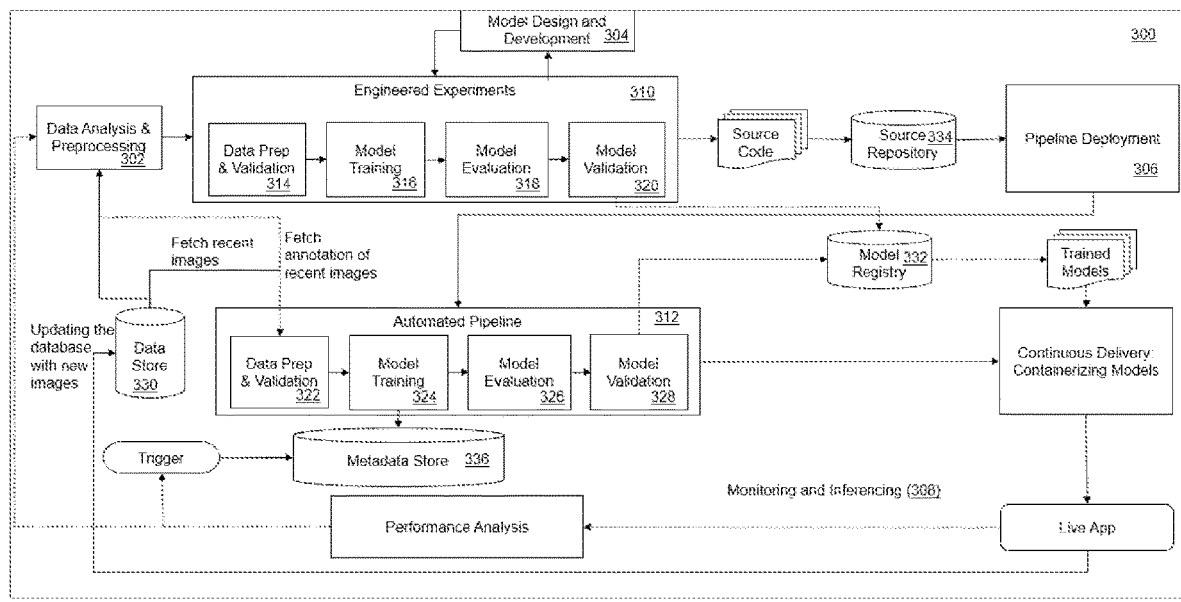
FIG. 3 is a diagram that illustrates an AI pipeline in conjunction with an AI model development process in accordance with an exemplary embodiment of the disclosure.

FIG. 3 is a diagram that illustrates an AI pipeline in conjunction with an AI model development process in accordance with an exemplary embodiment of the disclosure. Referring to FIG. 3, there is shown the AI model development process of an AI pipeline 300 which is largely divided into four sections namely, Data analysis and Pre-processing 302
Model design and Development 304
Deployment 306
Monitoring and Inferencing 308

The AI model development and deployment may be set on auto-trigger if the model needs more data to improve on the precision. To incorporate this in the AI pipeline 300, two sections may be implemented as shown in FIG. 3, Engineered Experiments section 310 and Automated Pipeline section 312. Both these sections follow a four-step development process, as depicted in FIG. 3.

The four-step development process in the engineered experiments section 310 includes data preparation and validation 314, model training 316, model evaluation 318 and model validation 320.

The four-step development process in the automated pipeline section 312 includes data preparation and validation 322, model training 324, model evaluation 326 and model validation 328.

The research and development part of the product happens in the engineered experiments section 310 while the automated pipeline section 312 holds scripts that keep training the model until it reaches maximum precision possible.

In the AI pipeline 300, four kinds of storages are implemented: Data Store 330, Model Registry 332, Source Repository 334 and Metadata Store 336.

Data Store 330: This store holds all the images passed through client approved flag from the web portal. The annotations required for these images are also stored in this data store 330.

Model Registry 332: The model registry 332 is the place to store all the versions of the model. The associated data such as the training configuration is stored here along with the model.

Source Repository 334: The code required to train the model, test it and integrate it with webapp portal is stored in the source repository 334.

Metadata Store 336: This store logs all the workings of the automated AI pipeline 300. All information related to training performance, testing performance, errors, exceptions, timestamps, model versions, etc., are stored in the metadata store 336 to monitor the automated scripts.

In accordance with an exemplary implementation, a data architecture for the system and/or method of the present disclosure is described.

The web portal of the present disclosure sends all the images from a submitted inspection to Azure blob storage. The metadata associated with the images is stored in MySQL database hosted on Azure cloud. The images are stored in a folder on the Azure cloud with the encoded filenames and in a random order. The two storages, Azure blob storage and Azure SQL database are password protected individually. The two storages are connected on a need basis using SQL scripts which are run on Azure Machine Learning Studio to segregate and store the images in a categorized order. The categories are based on inspection point of the house and month of the year when the inspection was reviewed. These ordered images are then used for data analytics and AI model development. The Azure blob storage associated with Azure Machine Learning is different than the blob associated with web portal and stores only the image data which is approved.

Figure 4:
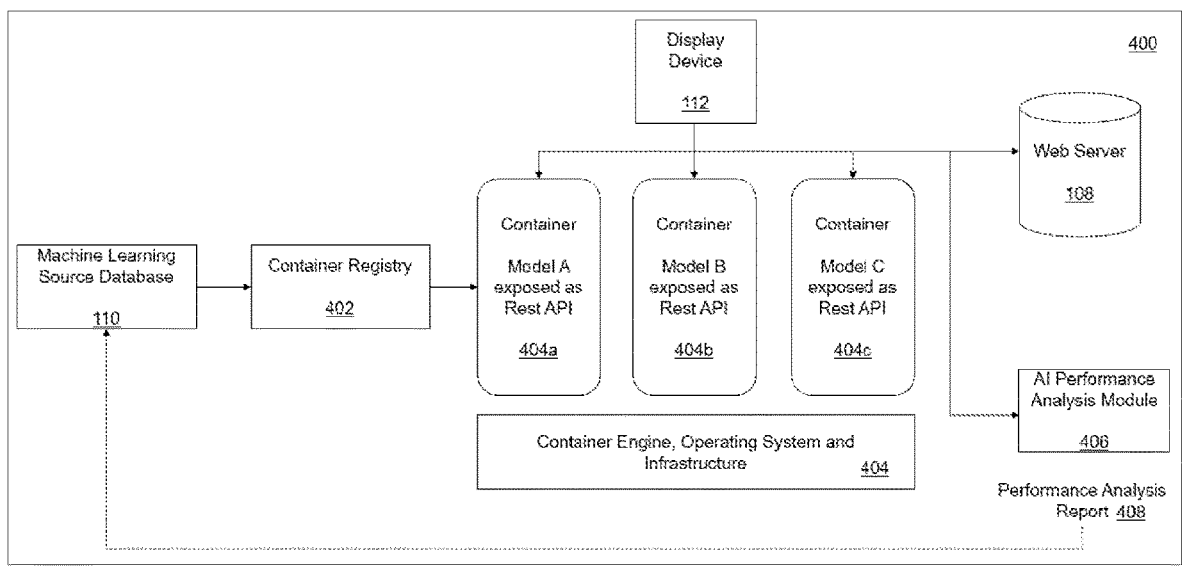
FIG. 4 illustrates a deployment architecture 400 for secondary AI models in accordance with an exemplary embodiment of the disclosure.

FIG. 4 illustrates a deployment architecture 400 for secondary AI models in accordance with an exemplary embodiment of the disclosure. Referring to FIG. 4, there is shown a deployment architecture 400 that includes the ML source database 110, a container registry 402, a container engine, operating system and infrastructure 404 comprising a plurality of containers 404a, 404b, 404c, the web server 108, an AI performance analysis module 406, the display device 112, and a performance analysis report 408.

As illustrated in FIG. 4, the deployment of the secondary AI models is continuous using containerization method. The containerized approach allows to initiate auto-training of a model when new data arises and deploy to the web app automatically after passing through filter of metrics. It also allows to scale with minimal regression impact and minimal manual interference.

The ML source database 110 receives data from the AI performance analysis module 406 to store images of classified inspection and sub-inspection points and condition of the sub-inspection points in a categorized order. The categories are based on inspection point of the home and month of the year when the inspection was reviewed. These ordered images are then used for data analytics and AI model development. The performance analysis report 408 may also be provided to the ML source database 110 for further training and model development.

The container registry 402 of the deployment architecture 400, connected to the ML source database 110, may comprise one or more repositories configured to store files and/or directories corresponding to container images, such as container image, and metadata for files and/or directories.

Each container of the containers 404a, 404b, 404c of the deployment architecture 400 comprises a model such as, Model A, Model B, and Model C that is exposed as Rest Application Programming Interface (API).

The web server 108 of the deployment architecture 400 may be a laptop computer, netbook computer, personal computer (PC), a desktop computer, or any programmable electronic device or any network of programmable electronic devices capable of hosting and running a monitoring program and a database and communicating with the display device 112, in accordance with embodiments of the present disclosure. As will be discussed with reference to FIG. 4, the web server 108 may include internal components and external components, respectively. The web server 108 may also operate in a cloud computing service model, such as Software as a Service (SaaS), Platform as a Service (PaaS), or Infrastructure as a Service (IaaS). The web server 108 may also be located in a cloud computing deployment model, such as a private cloud, community cloud, public cloud, or hybrid cloud.

The display device 112 of the deployment architecture 400 may be implemented using any device capable of wireless communication, including but not limited to a cellular telephone, computer, server, router, laptop, tablet, wearable device, watch, appliance, automobile, or airplane. The display device 112 may be configured to (e.g., include hardware and/or firmware and software for) communicate using a particular protocol for a wireless communication signal (e.g., Bluetooth Low Energy, Bluetooth Smart, Wi-Fi, CDMA, TDMA).

Figure 5:
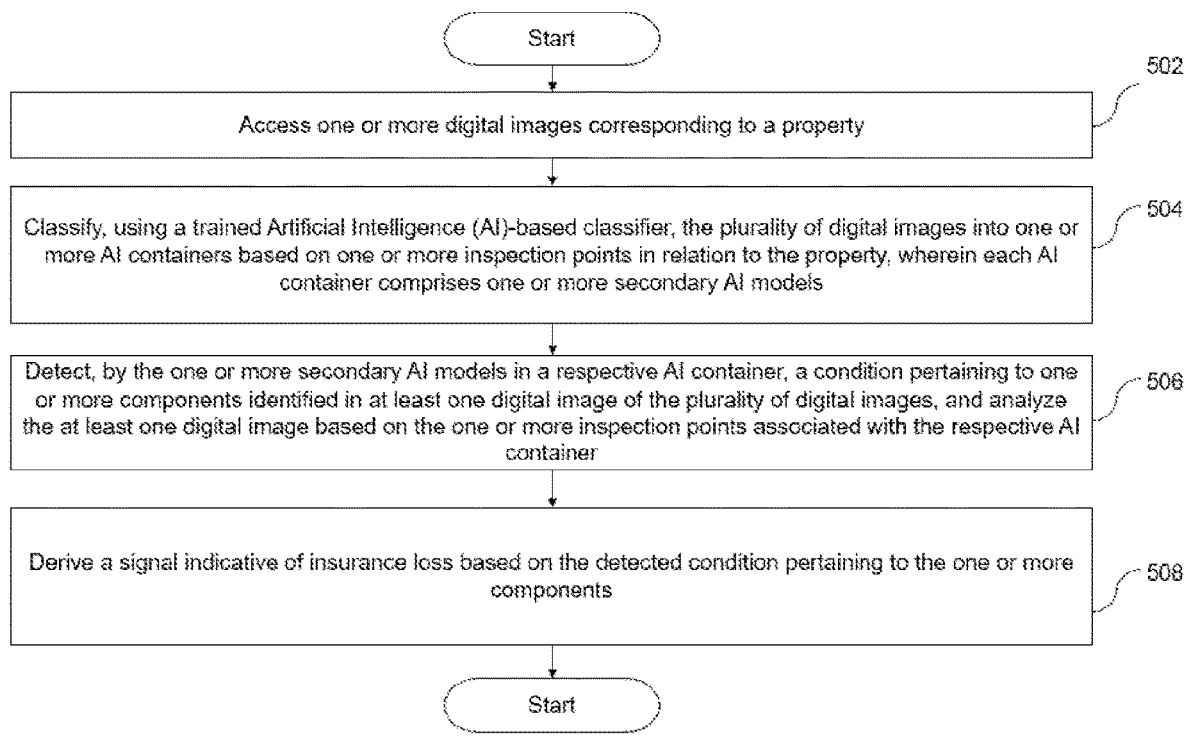
FIG. 5 is a diagram that illustrates a flowchart of a method for detecting insurance loss or risk, in accordance with an exemplary embodiment of the disclosure.

FIG. 5 is a diagram that illustrates a flowchart of a method for detecting insurance loss or risk in accordance with an exemplary embodiment of the disclosure. Referring to FIG. 5, there is shown a flowchart 500 of a method for detecting insurance loss or risk using the AI-based inspection and loss prevention system 106.

At 502, access one or more digital images corresponding to a property. The I/O interfaces 210 of the AI-based inspection and loss prevention system 106 are configured to access a plurality of digital images corresponding to a property. The property may include, but is not limited to, a home, a residential building and an office. The plurality of digital images may be accessed via different data interfaces or may be uploaded by one or more users (for example, homeowners). For instance, the plurality of digital images may be accessed from, but not limited to, satellite imaging data, aerial imaging data, street view data 106, property assessor's data, and building permits. In some embodiments, the plurality of digital images are provided to the AI-based inspection and loss prevention system 106 via the I/O interfaces 210 from the mobile app/website 102.

At 504, classify, using a trained Artificial Intelligence (AI)-based classifier, the plurality of digital images into one or more AI containers based on one or more inspection points in relation to the property, wherein each AI container comprises one or more secondary AI models. The AI-based classifier 214 of the AI-based inspection and loss prevention system 106 is configured to classify the plurality of digital images into one or more AI containers 216 based on one or more inspection points in relation to the property. Each AI container includes one or more secondary AI models 218. The one or more inspection points may include, but are not limited to, toilet plumbing, sink plumbing, washer supply line and valve, electrical panel, water heater, address verification, product label and roof model.

At 506, detect, by the one or more secondary AI models in a respective AI container, a condition pertaining to one or more components identified in at least one digital image of the plurality of digital images, and analyze the at least one digital image based on the one or more inspection points associated with the respective AI container. The one or more secondary AI models 218 in a respective AI container are configured to detect a condition pertaining to one or more components identified in one or more digital images. The condition is detected based on analyzing the one or more digital images based on the one or more inspection points associated with the respective AI container. A condition is at least one of a damage and a health status of a component, wherein the component may be a home component in an instance.

At 508, derive a signal indicative of insurance loss based on the detected condition pertaining to the one or more components. The loss/risk derivation component 220 of the AI-based inspection and loss prevention system 106 is configured to derive a signal indicative of insurance loss based on the detected condition pertaining to the one or more components.

The present disclosure is advantageous in that it provides an AI-based insurance technology to drive loss prevention for homeowners and home warranty insurance companies. The present disclosure infers significant risk areas in insurance companies' book of business, and identifies methods to identify, assess and act on loss prevention. Through this knowledge, the proprietary technology of the disclosure drives loss prevention for the home insurance and home warranty industries.

Those skilled in the art will realize that the above recognized advantages and other advantages described herein are merely exemplary and are not meant to be a complete rendering of all of the advantages of the various embodiments of the present disclosure.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus/devices adapted to carry out the methods described herein may be suited. A combination of hardware and software may be a general-purpose computer system with a computer program that, when loaded and executed on the computer system may control the computer system such that it carries out the methods described herein. The present disclosure may be realized in hardware that comprises a portion of an integrated circuit that also performs other functions. The present disclosure may also be realized as a firmware which form part of the media rendering device.

The present disclosure may also be embedded in a computer program product, which includes all the features that enable the implementation of the methods described herein, and which when loaded and/or executed on a computer system may be configured to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

In the foregoing complete specification, specific embodiments of the present disclosure have been described. However, one of ordinary skill in the art appreciates that various modifications and changes can be made without departing from the scope of the present disclosure. Accordingly, the specification and figures are to be regarded in an illustrative rather than a restrictive sense, and all such modifications are intended to be included within the scope of the present disclosure.

The invention claimed is:

1. A computer-implemented method, comprising:
   auto-training an Artificial Intelligence (AI)-based classifier based on a first plurality of digital images to improve precision of the AI-based classifier;
   accessing a second plurality of digital images corresponding to a property;
   classifying, using the AI-based classifier, the second plurality of digital images into one or more AI containers based on one or more inspection points related to the property, wherein each AI container of the one or more AI containers comprises one or more secondary AI models;
   scaling, by the one or more secondary AI models in a respective AI container of the one or more AI containers, one or more components in at least one digital image of the second plurality of digital images down to a specific pixel level;
   detecting, by the one or more secondary AI models, a condition pertaining to the one or more components in the at least one digital image on a pixel level scale, wherein
      the condition is at least one of a damage or a health status of a component of the one or more components,
      the detecting of the condition pertaining to the one or more components is based on the scaling of the one or more components, and
      the detecting comprises analyzing the at least one digital image based on the one or more inspection points associated with the respective AI container;
   deriving a signal indicative of insurance loss based on the detected condition pertaining to the one or more components; and
   generating inspection data based on the signal, wherein
      the generated inspection data includes at least one of recommendations related to insurance risks or insurance loss prevention actions, or an analytics dashboard, and
      the analytics dashboard indicates information on a health of the property in a case where the generated inspection data includes the analytics dashboard.

2. The computer-implemented method of claim 1, wherein the property is at least one of a home, a residential building, or an office.

3. The computer-implemented method of claim 1, wherein the second plurality of digital images comprises metadata, the metadata comprising at least one of a camera make, a camera model, white balance, ISO speed ratings, an aperture, a shutter speed, a timestamp, an image resolution, a file name, a file size, a lens used, a focal length, an exposure bias, or flash.

4. The computer-implemented method of claim 1, wherein the one or more inspection points comprise at least one of a toilet plumbing, sink plumbing, washer supply line and valve, electrical panel, water heater, address verification, product label, or roof model.

5. The computer-implemented method of claim 1, further comprising classifying, using the AI-based classifier, the second plurality of digital images into the one or more AI containers based on one or more categories and one or more sub-inspection points related to the property.

6. The computer-implemented method of claim 5, wherein the one or more categories comprise at least one of a home category or a room category.

7. The computer-implemented method of claim 5, wherein the one or more sub-inspection points comprise at least one of a water valve, a plumbing joint, a tank bolt, corrosion, rusting, a leaking water supply line, a coupler nut, mains breakers, a manufacture date of HVAC, a brand of HVAC, a manufacture date of furnace, or a brand of furnace.

8. The computer-implemented method of claim 1, wherein the component is a home component.

9. The computer-implemented method of claim 1, wherein the inspection data corresponds to an inspection report.

10. The computer-implemented method of claim 9, wherein the inspection report comprises at least one of an estimated cost to fix, an actual cost to fix, a client follow-up status, a resolution status, timestamps, or resolution notes.

11. A system, comprising:
    a memory;
    a processor communicatively coupled to the memory, wherein the processor is configured to:
       auto-train an Artificial Intelligence (AI)-based classifier based on a first plurality of digital images to improve precision of the AI-based classifier;
       access a second plurality of digital images corresponding to a property;
       classify, using the AI-based classifier, the second plurality of digital images into one or more AI containers based on one or more inspection points related to the property, wherein each AI container of the one or more AI containers comprises one or more secondary AI models;
       scale, by the one or more secondary AI models in a respective AI container of the one or more AI containers, one or more components in at least one digital image of the second plurality of digital images down to a specific pixel level;

detect, by the one or more secondary AI models, a condition pertaining to the one or more components in the at least one digital image on a pixel level scale, wherein the condition is at least one of a damage or a health status of a component of the one or more components, and the detecting of the condition pertaining to the one or more components is based on the scaling of the one or more components, and analyze the at least one digital image based on the one or more inspection points associated with the respective AI container;

derive a signal indicative of insurance loss based on the detected condition pertaining to the one or more components; and generate inspection data based on the signal, wherein the generated inspection data includes at least one of recommendations related to insurance risks or insurance loss prevention actions, or an analytics dashboard, and the analytics dashboard indicates information on a health of the property in a case where the generated inspection data includes the analytics dashboard.

12. The system of claim 11, wherein the one or more inspection points comprise at least one of a toilet plumbing, sink plumbing, washer supply line and valve, electrical panel, water heater, address verification, product label, or roof model.

13. The system of claim 11, wherein the processor is further configured to classify, using the AI-based classifier, the second plurality of digital images into the one or more AI containers based on one or more categories and one or more sub-inspection points related to the property.

14. The system of claim 13, wherein the one or more categories comprise at least one of a home category or a room category.

15. The system of claim 13, wherein the one or more sub-inspection points comprise at least one of a water valve, a plumbing joint, a tank bolt, corrosion, rusting, a leaking water supply line, a coupler nut, mains breakers, a manufacture date of HVAC, a brand of HVAC, a manufacture date of furnace, or a brand of furnace.

16. The system of claim 11, wherein the inspection data corresponds to an inspection report.

* * * * *